(12) United States Patent
Nakao

(10) Patent No.: US 7,949,070 B2
(45) Date of Patent: May 24, 2011

(54) METHOD AND APPARATUS FOR EXECUTING MIMO EIGENMODE TRANSMISSION

(75) Inventor: Seigo Nakao, Yokosuka (JP)

(73) Assignee: Sanyo Electric Co., Ltd., Osaka (JP)

( * ) Notice: Subject to any disclaimer, the term of this patent is extended or adjusted under 35 U.S.C. 154(b) by 749 days.

(21) Appl. No.: 11/984,318

(22) Filed: Nov. 15, 2007

(65) Prior Publication Data

US 2008/0123769 A1 May 29, 2008

(30) Foreign Application Priority Data

Nov. 15, 2006 (JP) ................................. 2006-309659
Nov. 15, 2006 (JP) ................................. 2006-309660

(51) Int. Cl.
*H04K 1/02* (2006.01)
*H04L 25/03* (2006.01)
*H04L 25/49* (2006.01)

(52) U.S. Cl. ....................................... 375/296; 375/260
(58) Field of Classification Search .................. 375/224, 375/259–260, 267, 285, 295–296, 299
See application file for complete search history.

(56) References Cited

U.S. PATENT DOCUMENTS

| | | | |
|---|---|---|---|
| 6,598,014 B1 * | 7/2003 | Rabideau et al. | 702/194 |
| 7,099,698 B2 * | 8/2006 | Tarokh et al. | 455/562.1 |
| 7,218,906 B2 * | 5/2007 | Sayeed et al. | 455/295 |
| 7,634,017 B2 * | 12/2009 | Sawai | 375/267 |
| 7,737,892 B2 * | 6/2010 | Richardson et al. | 342/375 |
| 2006/0270352 A1 * | 11/2006 | Webster et al. | 455/63.4 |

OTHER PUBLICATIONS

Sakaguchi et al. "Initial Measurement on MIMO eigenmode Communcation System" IEICE Transactions on Communications, vol. J87-B, No. 9, pp. 1454-1466, Sep. 2006.

* cited by examiner

*Primary Examiner* — Jean B Corrielus
(74) *Attorney, Agent, or Firm* — McDermott Will & Emery LLP

(57) ABSTRACT

Antennas transmit signals weighted by a weight vector. A control unit acquires, via a radio unit and the like, a predetermined column from a steering matrix derived by performing singular value decomposition on a channel matrix whose element values are channel characteristics between a plurality of transmitting antennas and a plurality of receiving antennas, respectively. The control unit varies each of components contained in the acquired column vector so as to derive a weight vector that varies with time.

12 Claims, 12 Drawing Sheets

FIG.4A

| L-STF | L-LTF | L-SIG | HT-SIG | HT-STF | HT-LTF | -HT-LTF | HT-LTF | -HT-LTF | | DATA 1 |
|---|---|---|---|---|---|---|---|---|---|---|

| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | | DATA 2 -400ns |
|---|---|---|---|---|---|---|---|---|---|---|

| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | | DATA 3 -200ns |
|---|---|---|---|---|---|---|---|---|---|---|

| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | | DATA 4 -600ns |
|---|---|---|---|---|---|---|---|---|---|---|

FIG.4B

| L-STF | L-LTF | L-SIG | HT-SIG | HT-STF | HT-LTF | -HT-LTF | HT-LTF | -HT-LTF | | DATA 1 |
|---|---|---|---|---|---|---|---|---|---|---|

| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | | DATA 2 -400ns |
|---|---|---|---|---|---|---|---|---|---|---|

| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | | DATA 3 -200ns |
|---|---|---|---|---|---|---|---|---|---|---|

FIG.4C

| L-STF | L-LTF | L-SIG | HT-SIG | HT-STF | HT-LTF | HT-LTF | | DATA 1 |
|---|---|---|---|---|---|---|---|---|

| L-STF -50ns | L-LTF -50ns | L-SIG -50ns | HT-SIG -50ns | HT-STF -400ns | HT-LTF -400ns | -HT-LTF -400ns | | DATA 2 -400ns |
|---|---|---|---|---|---|---|---|---|

FIG.4D

| L-STF | L-LTF | L-SIG | HT-SIG | HT-STF | HT-LTF | DATA 1 |
|---|---|---|---|---|---|---|

FIG.7

| HT-STF1 | HT-LTF1 | HT-LTF5 | HT-LTF9 | HT-LTF13 | DATA A |
|---|---|---|---|---|---|
| HT-STF2 -50ns | HT-LTF2 -50ns | HT-LTF6 -50ns | HT-LTF10 -50ns | HT-LTF14 -50ns | DATA B -50ns |
| HT-STF3 -100ns | HT-LTF3 -100ns | HT-LTF7 -100ns | HT-LTF11 -100ns | HT-LTF15 -100ns | DATA C -100ns |
| HT-STF4 -150ns | HT-LTF4 -150ns | HT-LTF8 -150ns | HT-LTF12 -150ns | HT-LTF16 -150ns | DATA D -150ns |

52

METHOD AND APPARATUS FOR EXECUTING MIMO EIGENMODE TRANSMISSION

CROSS-REFERENCE TO RELATED APPLICATIONS

This application is based upon and claims the benefit of priority from the prior Japanese Patent Application No. 2006-309659, filed on Nov. 15, 2006 and Japanese Patent Application No. 2006-309660, filed on Nov. 15, 2006, the entire contents of which are incorporated herein by reference.

BACKGROUND OF THE INVENTION

1. Field of the Invention

The present invention relates to a transmitting technology, and it particularly relates to a transmitting method and apparatus for performing MIMO eigenmode transmission.

2. Description of the Related Art

One of techniques to realize a higher quality and a higher data transmission rate in a wireless communication system is a MIMO (Multiple-Input Multiple-Output) system. In this MIMO system, a transmitting apparatus and a receiving apparatus are each equipped with a plurality of antennas, and a plurality of channels corresponding respectively to the antennas are set. Accordingly, channels up to the maximum number of antennas are set for the communications between the transmitting apparatus and the receiving apparatus so as to achieve a high data transmission rate. Of such MIMO systems, a MIMO eigenmode system can increase the channel capacity. In the MIMO eigenmode system, derived is a channel matrix (hereinafter referred to as "H matrix") which is generated from values of channel characteristics between a plurality of antennas provided in the transmitting apparatus and those in the receiving apparatus. Then, eigenbeams corresponding to orthogonal channels the number of which is equal to the rank of an H matrix are formed in the MIMO eigenmode system. In so doing, the eigenbeams corresponding respectively to the orthogonal channels are formed.

When the thus formed eigenbeams continue to be fixed, the antenna directivity and the side lobe also continues to be fixed. In such a case, there are cases where radio apparatuses, which are not targeted ones, can continue to receive the eigenbeams at a certain level of signal strength. As a result, continuous interception is likely to occur. In terms of security, it is desirable that untargeted radio apparatuses will not continue to intercept.

SUMMARY OF THE INVENTION

The present invention has been made in view of such circumstances and a general purpose thereof is to provide a transmitting technology in MIMO eigenmode transmission where a continuous interception by untargeted radio apparatuses is reduced.

In order to resolve the above problems, a transmitting apparatus according to one embodiment of the present invention comprises: a plurality of transmitting antennas which transmit signals weighted with a weight vector; an acquiring unit which acquires a predetermined column vector from a steering matrix derived by performing singular value decomposition on a channel matrix whose element values are channel characteristics between the plurality of transmitting antennas and a plurality of receiving antennas, respectively; and a derivation unit which varies each of components contained in the column vector acquired by the acquiring unit so as to derive a time-varying weight vector.

Another embodiment of the present invention relates to a transmitting method. This method is a transmitting method for transmitting from a plurality of transmitting antennas a signal weighted with a weight vector, and it includes acquiring a predetermined column of a steering matrix which is derived by performing singular value decomposition on a channel matrix whose element values correspond to channel characteristics between the plurality of transmitting antennas and a plurality of receiving antennas, respectively, and deriving a time-varying weight vector by varying each of components contained in the acquired column vector.

Still another embodiment of the present invention relates also to a transmitting apparatus. This apparatus comprises: a plurality of transmitting antennas which transmit a signal composed of a plurality of streams by weighting the signal with a weight vector; an acquiring unit which acquires a steering matrix wherein the steering matrix is derived by performing singular value decomposition on a channel matrix whose element values correspond to channel characteristics between the plurality of transmitting antennas and a plurality of receiving antennas, respectively; and a derivation unit which derives a time-varying weight vector for one stream and derives time-varying weight vectors for the other streams, respectively, in a manner that a plurality of column vectors contained in the steering matrix acquired by the acquiring unit are associated with the plurality of streams, a plurality of candidates of weight vectors orthogonal to column vector corresponding to streams other than said one stream are derived and then the plurality of candidates are switched and selected.

Still another embodiment of the present invention relates also to a transmitting apparatus. This apparatus comprises: a plurality of antennas which transmit a signal composed of two streams by weighting the signal with a weight vector; an acquiring unit which acquires a steering matrix wherein the steering matrix is derived by performing singular value decomposition on a channel matrix whose element values correspond to channel characteristics between the plurality of transmitting antennas and a plurality of receiving antennas, respectively; and a derivation unit which associates two of column vectors contained in the steering matrix acquired by the acquiring unit with the two streams, derives a time-varying weight vector for one stream based on a column vector associated with said one stream and derives a time-varying weight vector for the other stream by varying each component contained in a column vector associated with the other stream.

Still another embodiment of the present invention relates also to a transmitting method. This method is a transmitting method for transmitting from a plurality of transmitting antennas a signal composed of a plurality of streams by weighting the signal with a weight vector, and comprises: acquiring a steering matrix which is derived by performing singular value decomposition on a channel matrix whose element values correspond to channel characteristics between the plurality of transmitting antennas and a plurality of receiving antennas, respectively; and deriving a time-varying weight vector for one stream and deriving time-varying weight vectors for the other streams, respectively, in a manner that a plurality of column vectors contained in the acquired steering matrix are associated with the plurality of streams, a plurality of candidates of weight vectors orthogonal to column vector corresponding to streams other than said one stream are derived and then the plurality of candidates are switched and selected.

Still another embodiment of the present invention relates also to a transmitting method. This method is a transmitting method for transmitting from a plurality of transmitting antennas a signal composed of two streams by weighting the signal with a weight vector, and it comprises: acquiring a steering matrix which is derived by performing singular value decomposition on a channel matrix whose element values correspond to channel characteristics between the plurality of transmitting antennas and a plurality of receiving antennas, respectively; and associating two of column vectors contained in the acquired steering matrix with the two streams, deriving a time-varying weight vector for one stream based on a column vector associated with said one stream, and deriving a time-varying weight vector for the other stream by varying each of components contained in a column vector associated with the other stream.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 4A to 4D illustrate packet formats in a communication system as shown in FIG. 2;

FIG. 7 illustrates a packet format of packet signals finally transmitted in the communication system shown in FIG. 2;

DETAILED DESCRIPTION OF THE INVENTION

The invention will now be described by reference to the preferred embodiments. This does not intend to limit the scope of the present invention, but to exemplify the invention.

An outline of the present invention will be given before a specific description thereof. Exemplary embodiments of the present invention relate to a communication system comprised of at least two radio apparatuses. A transmitting side (hereinafter referred to as "transmitting apparatus") in the radio apparatuses is compatible with a MIMO eigenmode transmission, and transmits packet a signal formed by one stream. The transmitting apparatus acquires channel characteristics corresponding respectively to a combination of a plurality of antennas in a transmitting apparatus and a plurality of antennas in a receiving apparatus. The channel characteristics corresponding respectively to the combination as described above are put together in the form or the like of a matrix and hereinafter such a matrix will be referred to as "H matrix". Since it is assumed herein that the MIMO system uses an OFDM scheme, the H matrix is derived on a carrier-by-carrier basis. The transmitting apparatus derives a steering matrix by singular-value-decomposing the H matrix carrier by carrier.

In the ordinary MIMO eigenmode transmission, a transmission weight vector is derived based on one column vector in a steering matrix. If such a transmission weight vector is fixed, the antenna directivity formed by a transmitting apparatus is also fixed. Accordingly, if an untargeted receiving apparatus is capable of receiving packet signals from the transmitting apparatus, the packet signals will be likely to be received continuously by the untargeted apparatus. As a result, an improvement in the security against a third party is required. The transmitting apparatus according to the present embodiment derives a time-varying transmission weight vector by varying each of components contained in the column vector.

Figure 1:
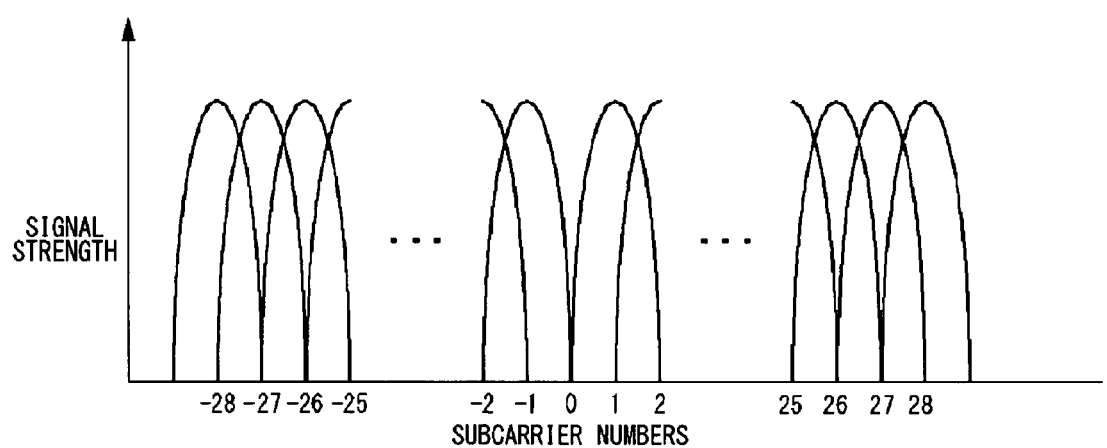
FIG. 1 illustrates a spectrum of a multicarrier signal according to an exemplary embodiment of the present invention.

FIG. 1 illustrates a spectrum of a multicarrier signal according to an exemplary embodiment of the present invention. In particular, FIG. 1 shows a spectrum of a signal in an OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a system (hereinafter referred to as a "legacy system") which is not compatible with a MIMO system. One example of legacy systems is a wireless LAN complying with the IEEE 802.11a standard. The unit of one signal in the time domain is the unit of one signal composed of a plurality of subcarriers. This unit will be called "OFDM symbol" herein.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation), 64-QAM and 256-QAM.

As an error correction scheme, convolutional coding is used for these signals. The coding rates for the convolutional coding are set to ½, ¾ and so forth. The number of data to be transmitted in parallel is set variably. As a result thereof, since the modulation scheme, the coding rate and the number of streams are set variably, the data rate is also set variably. It is to be noted that the "data rate" may be determined by arbitrary combination of these factors or by only one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
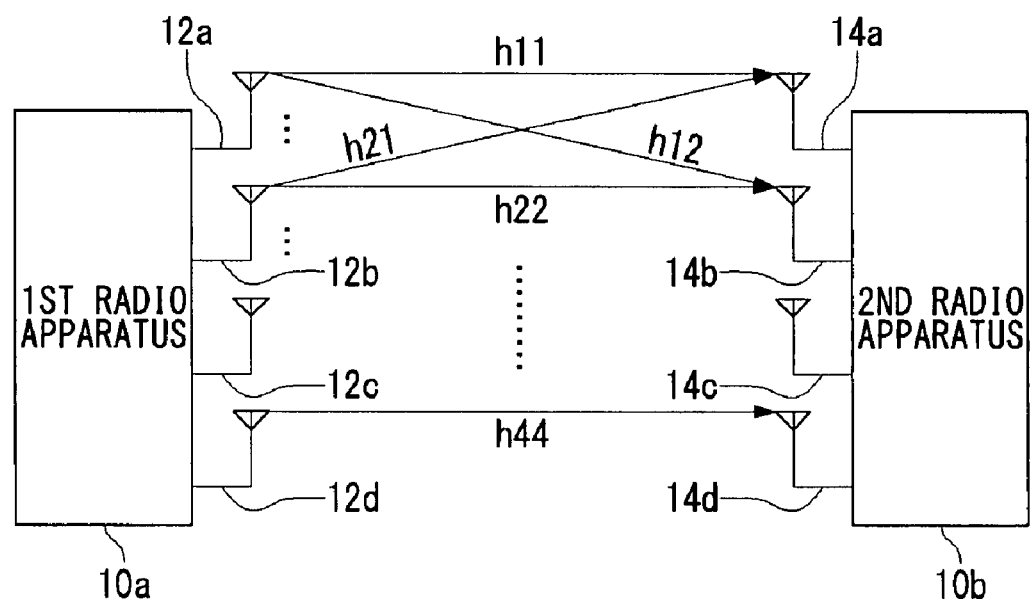
FIG. 2 illustrates a structure of a communication system according to an exemplary embodiment of the present invention.

FIG. 2 illustrates a structure of a communication system 100 according to an exemplary embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be explained as a structure of the communication system 100. Assume herein that data are being transmitted from the first radio apparatus 10a to the second radio apparatus 10b. The first radio apparatus 10a transmits respectively data of multiple streams from the first antenna 12a through the fourth antenna 12d, respectively. As a result, the data rate becomes higher. The second radio apparatus 10b receives the data of multiple streams by the first antenna 14a through the fourth antenna 14d. Further, the second radio apparatus 10b separates the received data by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. To acquire each channel characteristic, training signals are transmitted from the first radio apparatus 10a to the second radio apparatus 10b. Note that the roles of the first radio apparatus 10a and the second radio apparatus 10b may be reversed.

Figure 3:
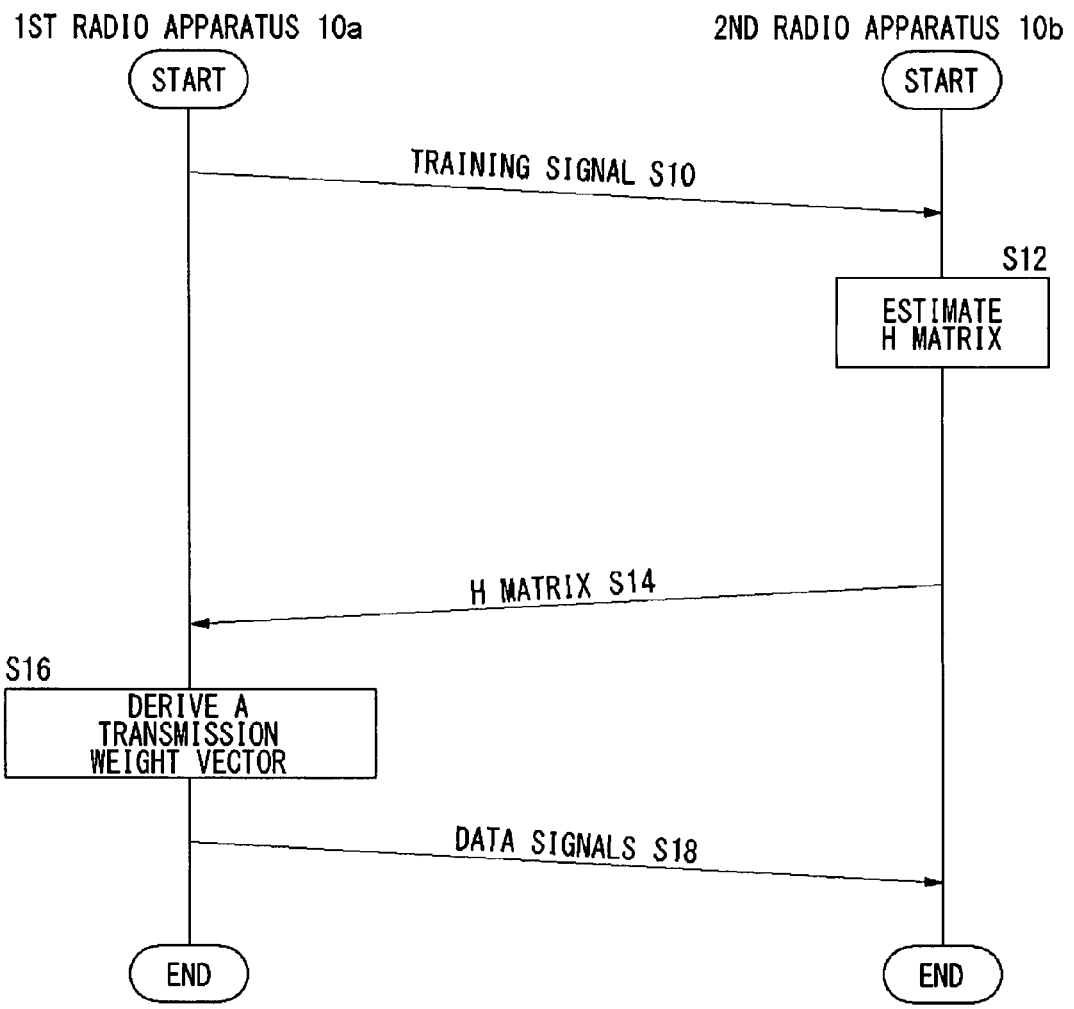
FIG. 3 is a sequence diagram showing a procedure for deriving a transmission weight vector in a communication system as shown in FIG. 2.

FIG. 3 is a sequence diagram showing a procedure for deriving a transmission weight vector in the communication system 100. The first radio apparatus 10a transmits a training signal to the second radio apparatus 10b (S10). The structure of a training signal will be discussed later. The second radio apparatus 10b estimates an H matrix, based on the training signal (S12). The second radio apparatus 10b transmits the H matrix to the first radio apparatus 10a (S14). The first radio apparatus 10a derives a steering matrix based on the H matrix and then derives a transmission weight vector (S16). While using the transmission weight vector, the first radio apparatus 10a transmits a data signal to the second radio apparatus 10b (S18). Subsequently, if the data signal is transmitted from the first radio apparatus 10a to the second radio apparatus 10b, the first radio apparatus 10a will use a time-varying transmission weight vector.

FIGS. 4A to 4D illustrate packet formats in the communication system 100. FIGS. 4A to 4D each shows a format of ordinary packet signals which is not the format of training signals. Here, FIG. 4A corresponds to a case where the number of streams is "4", FIG. 4B a case where the number of streams is "3", FIG. 4C a case where the number of streams is "2", and FIG. 4D a case where the number of streams is "1". As discussed above, the number of streams is "1" in the present exemplary embodiment, so that the case of FIG. 4D only applies. However, packet formats which will be used in the modifications described later are also explained here. It is assumed in FIG. 4A that data contained in four streams are to be transmitted and packet formats corresponding to first to fourth streams are shown in order from top to bottom.

In the packet signal corresponding to the first stream, "L-STF", "HT-LTF" and the like are assigned as preamble signals. "L-STF", "L-LTF", "L-SIG", "HT-SIG" and "HT-SIG" correspond to a known signal for AGC setting, a known signal for channel estimation and a control signal compatible with a legacy system, and a control signal compatible with a MIMO system, respectively. "HT-SIG1" and "HT-SIG" will be generically referred to as "HG-SIG". The control signal compatible with a MIMO system contains information on the number of streams and a destination of data, for example. "HT-STF" and "HT-LTF" correspond to a known signal for AGC setting and a known signal, for channel estimation, compatible with a MIMO system, respectively. "Data 1" is a data signal. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. In the packet signal corresponding to the third stream, "L-STF(−100 ns)", "HT-LTF(−200 ns)" and the like are assigned as preamble signals. In the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(−50 ns)" is "L-STF" given a cyclic timing shift by a delay of −50 ns. Assume herein that L-STF and HT-STF are each structured by a repetition of an 800 ns duration and that the other parts such as HT-LTF are each constituted by a repetition of a 3.2 μs GI area. Here, the CDD is also applied to "Data 1" to "Data 4" and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all of the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. Also, the receiving apparatus extracts a desired signal for the third stream by computing "first component−second component−third component+fourth component" for received signals of all the streams. Also, the receiving apparatus extracts a desired signal for the fourth stream by computing "first component+second component−third component−fourth component" for received signals of all the streams. These correspond to the fact that the combination of the signs of predetermined components has an orthogonal relationship among the streams. Note that the addition and subtraction processing are done by vector operation.

Similar to the legacy system, "52" subcarriers are used for the fields starting from "L-LTF" up to "HT-SIG" and the like. Of "52" subcarriers, "4" subcarriers correspond to pilot signals. Fields from "HT-LTF" onward use "56" subcarriers.

In FIG. 4A, the sign of "HT-LTF" is defined as follows. The signs are arranged in order from the top of the first stream as "+ (plus)", "− (minus)", "+" and "−"; the signs are arranged in order from the top of the second stream as "+", "+", "+" and "+"; the signs are arranged in order from the top of the third stream as "+", "−", "−" and "+"; and the signs are arranged in order from the top of the fourth stream as "+", "+", "−" and "−". However, the signs may be defined as follows. That is, the signs are arranged in order from the top of the first stream as "+", "−", "+" and "+"; the signs are arranged in order from the top of the second stream as "+", "+", "−" and "+"; the signs are arranged in order from the top of the third stream as "+", "+", "+" and "−"; and the signs are arranged in order from the top of the fourth stream as "−", "+", "+" and "+". In such signs, too, the orthogonal relationship holds between the streams in the combination of signs of predetermined components.

FIG. 4B corresponds to the first stream through the third stream of FIG. 4A. FIG. 4C is similar to the first stream and second stream of the packet formats shown in FIG. 4A. Here, the assignment of "HT-LTFs" in FIG. 4B differs from that of "HT-LTFs" in FIG. 4A. That is, the first components and the second components only are contained in HT-LTFs. In the first stream, HT-LTFs are assigned in the order of "HT-LTF" and "HT-LTF" from the top, whereas in the second stream they are assigned in the order of "HT-LTF" and "−HT-LTF". A receiving apparatus extracts a desired signal for the first stream by computing "first component+second component" for received signals of all the streams. Also, the receiving apparatus extracts a desired signal for the second stream by computing "first component−second component" for received signals of all the streams. In this case, too, the orthogonal relationship holds as described earlier. In FIG. 4D, a single "HT-LTF" only is assigned. Here, the packet signals as shown in FIGS. 4A to 4D may be transmitted by the MIMO eigenmode transmission while they undergo beamforming.

Figure 5A:
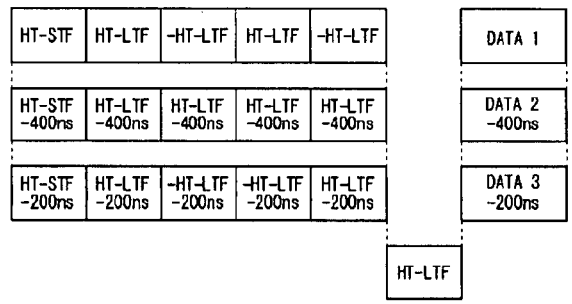
FIGS. 5A to 5D illustrate packet formats for use with training signals in a communication system as shown in FIG. 2.
Figure 5B:
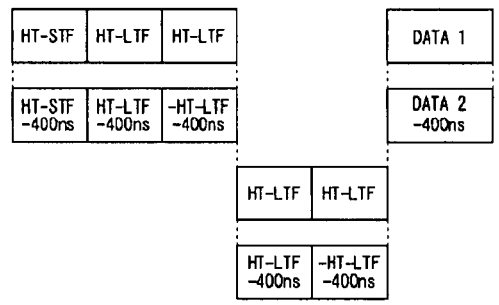
Figure 5C:
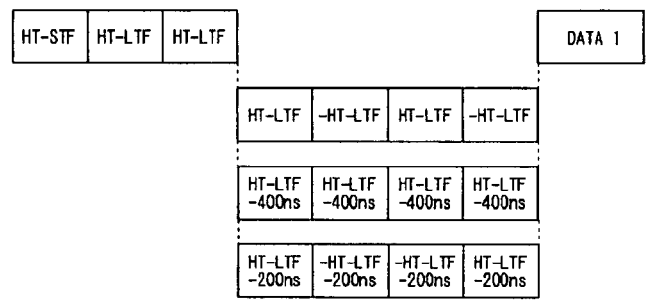
Figure 5D:
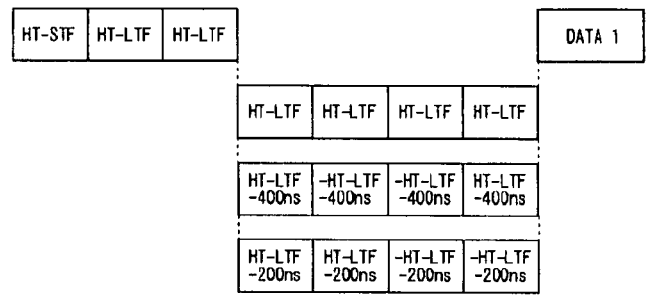

FIGS. 5A to 5D illustrate packet formats for use with training signals in the communication system 100. The training signal indicates a packet signal where the number of streams to which known signals for use with channel estimation, namely HT-LTFs, are assigned is larger than the number of streams to which data signals are assigned. For clarity, "L-STF" to "HT-SIG" contained in a packet format are omitted here. That is, a structure from "HT-STF" onward is shown here. FIG. 5A represents a case where the number of streams to which a data signal is assigned (hereinafter this stream will be referred to as "main stream") is "3". FIG. 5B represents a case where the number of main streams is "2". FIGS. 5C and 5D represent a case where the number of main streams is "1". That is, a data signal is assigned to each of the first stream to the third stream in FIG. 5A; a data signal is assigned to each of the first stream and the second stream in FIG. 5B; and a data signal is assigned to the first stream in FIG. 5C and FIG. 5D.

The assignment up to HT-LTF in the first stream to the third stream in FIG. 5A is the same as that of FIG. 4B. In a position posterior thereto, however, a blank duration is provided in the first stream to the third stream. In the fourth stream, on the other hand, HT-LTF is assigned to the position corresponding to the blank duration in the first to third streams. Following the HT-LTF assigned in the fourth stream, Data are assigned to the first to third streams. One HT-LTF is assigned in the fourth stream.

The assignment as described above makes the number of streams to which "HT-STF" is assigned equal to the number of streams to which a data signal is assigned, so that the error contained in the gain set by "HT-STF" becomes small at a receiving apparatus, thus preventing the worsening of data signal receiving characteristics. Also, the "HT-LTF" assigned to the fourth streams is only assigned to a single stream. Thus, the possibility where "HT-LTF" assigned to the fourth stream in the receiving apparatus is amplified to such an extent that the distortion is caused by AGC can be reduced. Hence, the deterioration in the accuracy of channel estimation can be prevented.

The assignment up to HT-LTF in the first stream and the second stream in FIG. 5B is the same as that of FIG. 4C. In a position posterior thereto, however, a blank duration is provided in the first stream and the second stream. In the third stream and the fourth stream, on the other hand, HT-LTFs are assigned to the position corresponding to the blank duration in the first and second streams. Following the HT-LTF assigned in the third and fourth streams, Data are assigned to the first and second streams. The assignment of HT-LTFs in the third and fourth streams are the same as that in FIG. 4C.

Here it is assumed that the degrees of priority for the amounts of timing shift are defined in the descending order of "0 ns", "−400 ns", "−200 ns" and "−600 ns". In other words, "0 ns" has the highest degree of priority, and "−600 ns" the lowest. Accordingly, the values of "0 ns" and "−400 ns" are used as the timing shift amounts in the first and second streams. In the third and fifth streams, the values of "0 ns" and "−400 ns" are also used as the timing shift amounts. As a result, the combination of "HT-LTF" and "HT-LTF" in the first stream is also used in the third stream, and the combination of "HT-LTF (−400 ns)" and "−HT-LTF (−400 ns)" in the second stream is also used in the fourth stream, thus making the processing simpler.

The assignment up to HT-LTF in the first stream in FIG. 5C is the same as that in the first stream of FIG. 5B. Here, two "HT-LTFS" are assigned.

In a position posterior thereto, however, a blank duration is provided in the first stream. In the second to fourth streams, on the other hand, HT-LTFs are assigned to the position corresponding to the blank duration in the second to fourth streams. Following the HT-LTFs assigned in the second to fourth streams, Data is assigned to the first stream. The assignment of HT-LTFs in the second and third streams are similar to that in FIG. 9B.

The packet format of FIG. 5D is structured the same way as with FIG. 5C. However, the combination of the signs of "HT-LTF" in FIG. 5D differs from that in FIG. 5C. Here, the combination of the signs of "HT-LTFs" is defined so that an orthogonal relationship will hold among the streams. Furthermore, in FIG. 5D, the combination of the signs of "HT-LTFs" is so defined as to be fixed for each of a plurality of streams. Similar to FIG. 5C, "0 ns", "−400 ns" and "−200 ns", which have higher degrees of priority, are used even in the second to fourth streams in FIG. 5D.

One "HT-LTF" is assigned to the fourth stream which is a stream where no data is assigned (hereinafter such a stream as this will be referred to as "sub-stream") in FIG. 5A. Two "HT-LTFs" are assigned to each of the third and fourth streams in FIG. 5B. Four "HT-LTFs" are assigned to each of the second to fourth streams in FIGS. 5C and 5D. Comparing these, it is found that the length of "HT-LTF" assigned to the sub-streams in FIGS. 5C and 5D is the longest. That is, as the number of main streams in packet signal where training signals are to be produced increases, the length of sub-stream will decrease and therefore the transmission efficiency improves. Note that the training signals are transmitted without being subjected to the beamforming such as MIMO eigenmode transmission.

FIGS. 6A to 6D illustrate another packet formats for training signals in a communication system shown 100. FIGS. 6A to 6D correspond to FIGS. 5A to 5D, respectively. In FIGS. 6A to 6D, the amounts of timing shift are defined by associating them with a plurality of streams. Here, the timing shift amount of "0 ns" is defined for the first stream; the timing shift amount of "−400 ns" is defined for the second stream; the timing shift amount of "−200 ns" is defined for the third stream; and the timing shift amount of "−600 ns" is defined for the fourth stream.

Figure 6A:
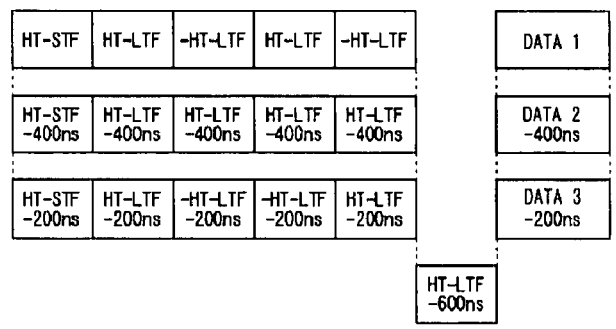
FIGS. 6A to 6D illustrate another packet formats for training signals in a communication system as shown in FIG. 2.

Accordingly, the timing shift amounts of "−600 ns" is used in FIG. 6A, instead of the timing shift amount of "0 ns" in the fourth stream in FIG. 5A. The timing shift amounts of "−200 ns" and "−600 ns" are used in FIG. 6B, instead of the timing shift amounts of "0 ns" and "−400 ns" in the third and the fourth stream in FIG. 5B. On the other hand, the timing shift amounts of "−400 ns", "−200 ns" and "−600 ns" are used in FIGS. 6C and 6D, instead of the timing shift amounts of "0 ns", "−400 ns" and "−200 ns" in the second to the fourth stream in FIGS. 5C and 5D.

Figure 6B:
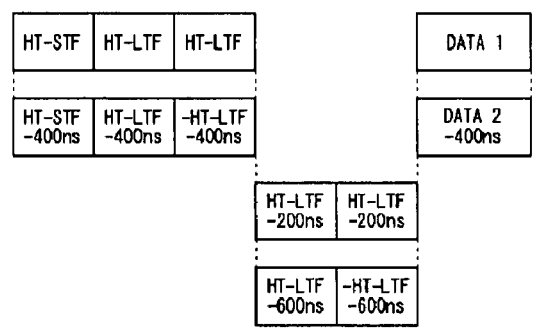
Figure 6C:
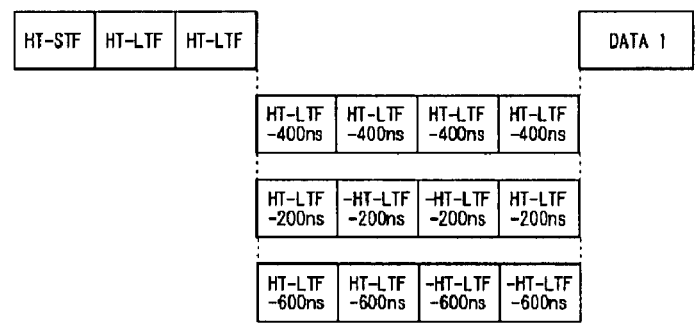
Figure 6D:
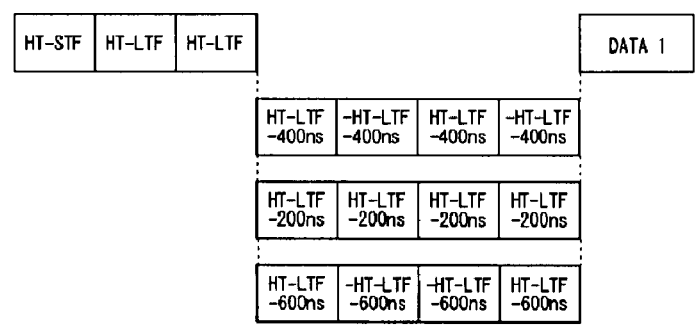

The packet format of FIG. 6D is structured the same way as that of FIG. 6C. However, the combination of the signs of "HT-LTF" in FIG. 6D differs from that in FIG. 6C. The combinations of the signs of "HT-LTF" are given degrees of priority beforehand. That is, the degrees of priority are defined so that the combination of signs in the first stream of FIG. 4A will have the highest degree of priority and that in the fourth stream thereof the lowest. For streams to which a data signal is assigned, the combinations of signs are used in order from one with the highest degree of priority. Also, for streams to which a data signal is not assigned, the combinations of signs are used in order from one with the highest degree of priority. In this manner, the combinations of signs are set the same way as with the both cases. Hence, when the receiving apparatus retrieves the respective components by performing + (plus) and − (minus) operations, a common circuit can be used in both of the calculation of channel characteristics for the part of "HT-LTF" in streams to which Data is not assigned and the calculation of channel characteristics for the part of "HT-LTF" in streams to which Data is assigned.

FIG. 7 illustrates a packet format of packet signals finally transmitted in the communication system 100. FIG. 7 corresponds to a modified version of a packet signal of FIG. 5B and FIG. 6B. An operation by an orthogonal matrix, which will be discussed later, is carried out on "HT-STF" and "HT-LTF", which are assigned to the first and second streams of FIG. 5B and FIG. 6B. As a result, "HT-STF1" to "HT-STF4" are generated. The same applies to "HT-LTF" as well. Furthermore, CDD is applied to each of the first to fourth streams by their respective timing shift amounts of "0 ns", "−50 ns", "−100 ns" and "1-150 ns". Note that the absolute value of timing shift amount in the second CDD is so set as to be smaller than the absolute value of timing shift amount in the first CDD for HT-STF and HT-LTF.

A similar processing is performed on "HT-LTF" assigned to the third and fourth streams, and "Data 1" and the like assigned to the first stream.

Figure 8:
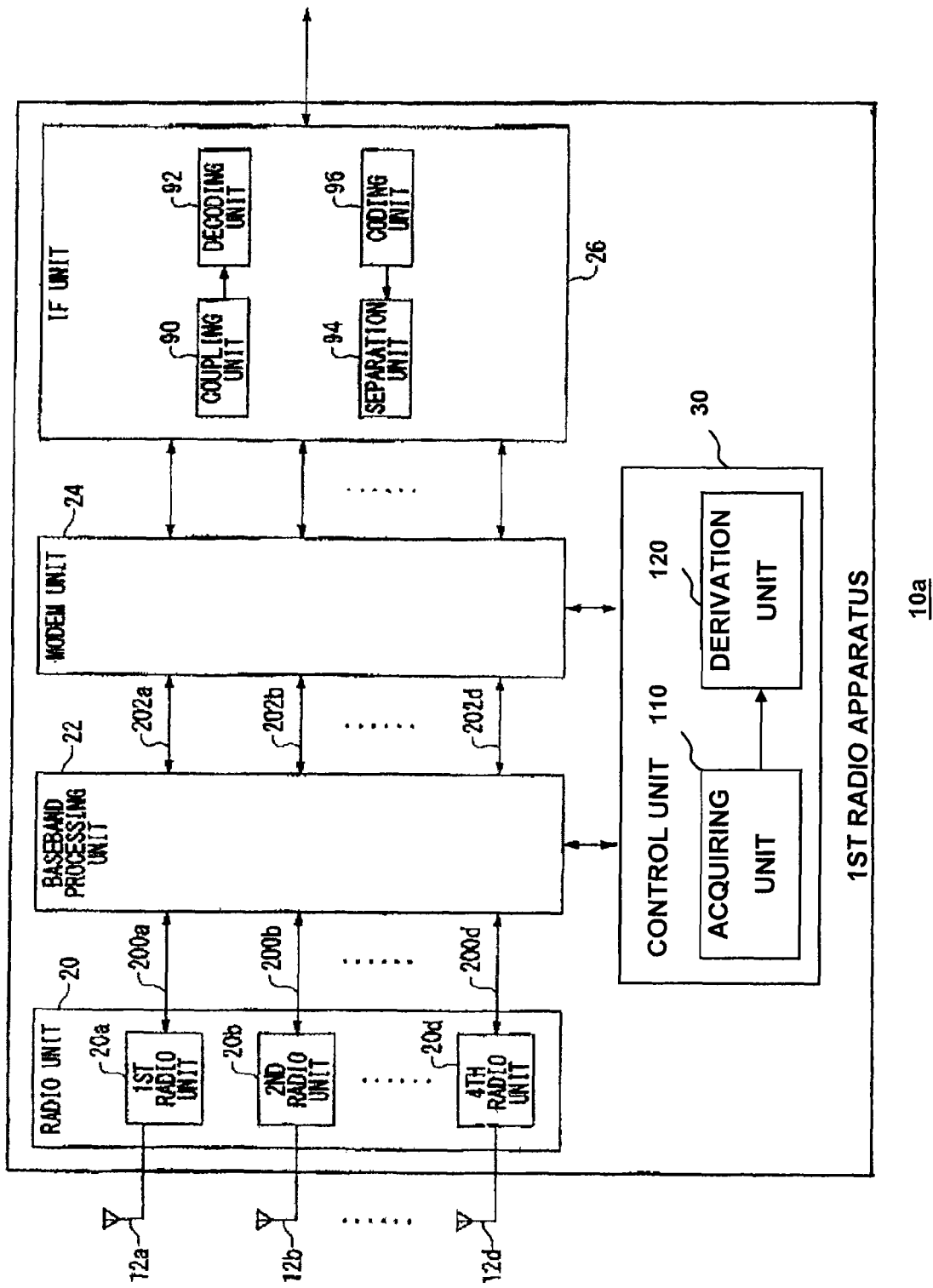
FIG. 8 illustrates a structure of a first radio apparatus as shown in FIG. 2.

FIG. 8 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. The IF unit 26 includes a coupling unit 90, a decoding unit 92, a separation unit 94 and a coding unit 96. The control unit 30 includes an acquiring unit 110 for acquiring a column vector from a steering matrix, and a derivation unit 112 for varying each of components contained in the column vector. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, . . . and a fourth frequency-domain signal 202d, which are generically referred to as "frequency-domain signal 202". The second radio apparatus 10b has a structure similar to that of the first radio apparatus 10a. The first radio apparatus 10a having a plurality of antennas 12 communicates with the not-shown second radio apparatus 10b having a plurality of antennas 14.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain based on "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted. As a transmission operation, the baseband processing unit 22 inputs, from the modem unit 24, the frequency-domain signals 202 serving as frequency-domain signals, and performs distribution processing by the weight vectors. That is, eigenbeams in a MIMO eigenmode transmission are formed. The MIMO eigenmode transmission will be discussed later.

The baseband processing unit 22 converts signals in the frequency domain into those in the time domain and outputs them as the time-domain signal 200. It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 9:
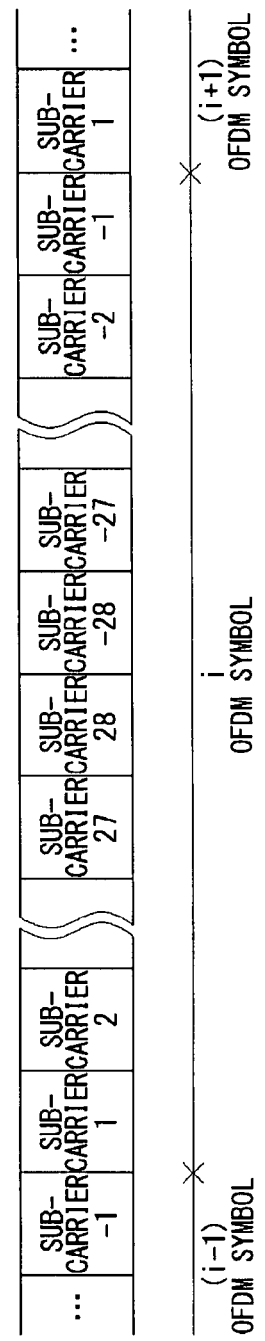
FIG. 9 illustrates a structure of a frequency-domain signal as shown in FIG. 8.

FIG. 9 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. In the fields such as "L-SIG" shown in FIG. 4A and so forth, a combination of the subcarrier numbers "−26" to "26" is used for one "OFDM symbol".

Refer back to FIG. 8. As a receiving processing, the modem unit 24 demodulates the frequency-domain signal 202 outputted from the baseband processing unit 22. The demodulation is carried out per subcarrier. The modem unit 24 outputs the demodulated signal to the IF unit 26. As a transmission processing, the modem unit 24 carries out modulation. The modem unit 24 outputs the modulated signal to the baseband processing unit 22 as a frequency-domain signal 202.

As a receiving processing, the IF unit 26 combines signals outputted from a plurality of modem units 24 and then forms one data stream. Further, the decoding unit 92 deinterleaves one data stream and then decodes the deinterleaved data stream. The IF unit 26 outputs the decoded data stream. As a transmission processing, the IF unit 26 inputs one data stream, then codes and interleaves it in the coding unit 96 and, thereafter, separates this data stream. Then the IF unit 26 outputs the thus separated data to a plurality of modem units 24.

The control unit 30 controls the timing and the like of the first radio apparatus 10a. A description will be given hereinbeolow of processing contents of the first radio apparatus 10a in a manner that associates them with operations shown in FIG. 3. Also, a brief description is given of MIMO eigenmode transmission before describing the processing in detail. In what follows, (1) an outline of MIMO eigenmode transmission, (2) transmission of training signals and (3) derivation of transmission weight vectors will be explained in this order.

(1) Outline of MIMO Eigenmode Transmission

An H matrix has the number of elements determined by the number of a plurality of antennas 12 and the number of a plurality of antennas 14 (not shown), per subcarrier. For example, if the number of a plurality of antennas 12 is "4" and the number of a plurality of antennas 14 is also "4" as shown in FIG. 2, the H matrix will be of 4×4 for each subcarrier. The respective components contained in the H matrix are the above-described channel characteristics and correspond to $h_{ij}$ as shown in FIG. 2.

As described above, such an H matrix is derived in the second radio apparatus 10b. For ease of explanation, a description is given hereinbelow of a processing performed on one subcarrier. The training signal received in the second radio apparatus 10b is denoted by a receiving signal vector X. Note that Y has components the number of which is equal to the number of antennas 14. Also, a training signal to be transmitted is denoted by a transmitting signal vector X. Note that X has components the number of which is equal to the number of antennas 12. With the definitions as above, the relationship among Y, X and the H matrix is expressed by the following Equation (1).

$$Y = HX + n \quad (1)$$

where n is a noise vector. The H matrix has the number of rows equivalent to the number of antennas 12 and the number of columns equivalent to the number of antennas 14. In the case of FIG. 2, each component of H matrix is expressed by the following matrix (2).

$$H = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix} \quad (2)$$

The first radio apparatus 10a subjects the H matrix to Singular Value Decomposition. The Singular Value Decomposition for H matrix is expressed by the following Equation (3).

$$\begin{aligned} H &= U \Sigma V^H \\ &= U \Sigma (V_1^H V_2^H V_3^H V_4^H) \end{aligned} \quad (3)$$

where $\Sigma$ is a diagonal matrix expressed by the following Equation (4).

$$\Sigma = \mathrm{diag}\left[ \sqrt{\lambda_1}, \ldots, \sqrt{\lambda_m} \right] \quad (4)$$

U and V are singular matrices and are each a unitary matrix of four rows corresponding to the number of the antennas 12 and four columns corresponding to the number of antennas 14. $V^H$ is composed of four column vectors, and these four column vectors correspond respectively to singular values contained in the singular value matrices. For example, if a packet signal formed of four streams is transmitted in the MIMO eigenmode transmission, v1 to v4 will be used as a receiving weight vector associated with the first to the fourth stream. In the second radio apparatus 10b, the receiving is done through a receiving weight vector denoted by $U^H$. Such a receiving vector is derived by MMSE (Minimum Mean Square Error).

(2) Transmission of Training Signals

The control unit 30 generates packet signals of packet formats as shown in FIGS. 5A to 5D, FIGS. 6A to 6D and FIG. 7 in cooperation with the baseband processing unit 22 and performs control to transmit the thus generated packet signals. Here, a description is given centering around a processing for generating the packet formats shown in FIG. 5B and FIG. 6B and the similar processing is performed on other packet formats as well.

Data to be assigned to at least one of a plurality of streams are inputted to the IF unit 26. As shown in FIG. 5B and FIG. 6B, data to be assigned to two streams are inputted here. The control unit 30 instructs the baseband processing unit 22 to generate packet signals from "HT-STFs" assigned to the two streams, namely the first and second streams, "HT-LTFs" assigned, in positions posterior to "HT-STF", to a plurality of streams, and Data assigned to the first and second streams. The control unit 30 instructs the baseband processing unit 22 to the effect that "L-STF", "L-LTF", "L-SIG" and "HT-SIG" be assigned anterior to HT-STF as shown in FIGS. 4A to 4C.

A description is given here of a case where two "HT-LTFs" are assigned to one stream as shown in FIG. 5B and FIG. 6B. That is, the entire "HT-LTFs" are formed by repeating "HT-LTF" in the time domain. Also, the combination of signs of "HT-LTFs" is defined so that the orthogonality will hold between main streams or between sub-streams. As a result, as described above, HT-LTF is extracted for the first stream if the first component and the second component are added up in a main stream. Also, HT-LTF is extracted for the second stream if the second component is subtracted from the first component in a main stream.

The number of "HT-LTFs" assigned to each stream is determined by the number thereof required for the orthogonality to hold. Accordingly, if the number of streams required for the orthogonal relationship to hold is "2", the number of "HT-LTFs" for each stream will be "2". If, on the other hand, the number of streams required for the orthogonal relationship to hold is "3" or "4", the number of "HT-LTFs" for each stream will be "4".

The control unit 30 has the baseband processing unit 22 apply CDD to HT-LTF and the like. CDD means that HT-LTF assigned to one stream is used as a reference or benchmark and then HT-LTFs assigned to the other streams undergo timing shifts within HT-LTF. The control unit 30 sets up beforehand a degree of priority for the amounts of timing shift. Here, as described above, "0 ns" has the highest degree of priority, and following this the degrees of priority for the amounts of timing shift are set in the descending order of "−400 ns", "−200 ns" and "−600 ns".

Further, the control unit 30 has the baseband processing unit 22 use the timing shift amounts in the descending order of degrees of priority for the main streams. For example, "0 ns" is used for the first stream and "−400 ns" is used for the second stream in the case of FIG. 5B. Also, the control unit 30 has the baseband processing unit 22 use the timing shift amounts in the descending order of degrees of priority for the sub-streams. For example, "0 ns" is used for the third stream and "−400 ns" is used for the fourth stream in the case of FIG. 5B. The above processing produces the packet signals having the packet format as shown in FIG. 5B.

Aside from this, mutually different values of timing shift amounts may be set respectively to a plurality of streams. For example, "0 ns" is set as the timing shift amount for the first stream; "−400 ns" is set as the timing shift amount for the second stream; "−200 ns" is set as the timing shift amount for the third stream; and "−600 ns" is set as the timing shift amount for the fourth stream. The above processing produces the packet signals of the packet format as shown in FIG. 6B.

With the above-described processing, after producing the packet signals of the packet formats as shown in FIGS. 5A to 5D and FIGS. 6A to 6D, the control unit 30 has the baseband processing unit 22 modify or deform such packet signals as these. That is, the control unit 30 modifies or deforms the packet formats as shown in FIG. 5B and FIG. 6B to the packet formats as shown in FIG. 7. After extending the number of streams to the number of multiple streams, the baseband processing unit 22 applies CDD to the thus extended streams. The control unit 30 has the baseband processing unit 22 transmit the modified packet signals to the radio unit 20.

(3) Derivation of Transmission Weight Vectors

The control unit 30 receives the H matrix from the second radio apparatus 10b by way of the radio units 20, the baseband processing unit 22 and the like. As described above, the control unit 30 derives the above-mentioned steering matrix by the singular value decomposition so as to acquire, for example, $V1^H$ (hereinafter referred to as "v1") from the steering matrix. In the exemplary embodiment, instead of using v1 intact as a transmission weight vector, the control unit 30 varies each of components contained in the acquired column vector v1 so as to derive a time-varying transmission weight vector. Here, in particular, while the phase of each component is fixed, the amplitude thereof is varied so as to derive the time-varying transmission weight vector. Note that the amplitude is varied for each packet signal.

The above processing will now be described specifically. Here, for the ease of explanation, assume that the column vector v1 has four components and these four components are denoted by v1(1), v1(2), v1(3) and v1(4). Also, each component is represented by a complex number which has an in-phase component and an orthogonal component. The control unit 30 stores a table in which variation patterns for v1(1), v1(2), v1(3) and v1(4) are respectively indicated. In this table, a plurality of gains, such as "1.1×", "0.9×" and "11.15×", are arranged. For each packet signal, the control unit 30 sequentially acquires, per packet signal, the gains starting from the beginning of the table and then multiplies each of them by v1(1) and the like. Here, the multiplication is performed on the in-phase component and the orthogonal component of the v1(1) and the like. As a result, the values of v1(1), v1(2), v1(3) and v1(4) vary for each packet signal. Here, the multiplication result will be denoted by v1'(1), v1'(2), v1'(3) and v1'(4).

Further, a varied column vector is denoted by v1' and the remaining components of the varied column are denoted by v1'(4). The control unit 30 determines the value of v1'(4) so that the value of inner product of v1 and v1' will be a predetermined value of "a". As a result, v1' is identified and the control unit 30 takes this v1' as the transmission weight vector. The above processing is performed in units of packet signal. That is, the control unit 30 varies components, other than one of components, by a predefined pattern and then derives a time-varying transmission weight vector by adjusting the one component so that the inner product of v1 and the transmission weight vector will be brought close to the value "α". As a result of the above, even if the values of a column vector are identical over a plurality of packet signals, the transmission weight vectors will be different valued per packet. Further, the baseband processing unit 22 transmits signals where the weighting is done by the weight vector.

In terms of hardware, this structure can be realized by a CPU, a memory of an arbitrary computer and other LSIs. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 10:
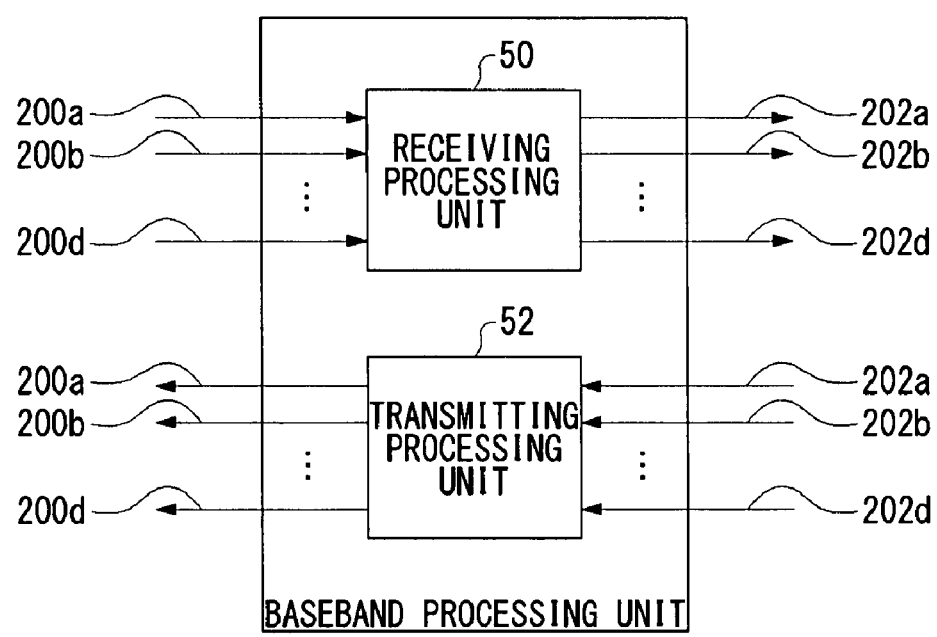
FIG. 10 illustrates a structure of a baseband processing unit as shown in FIG. 8.

FIG. 10 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors of the time-domain signal 200. Also, the receiving processing unit 50 outputs the result of array synthesis as the frequency-domain signal 202. The receiving processing unit 50 estimates the above-described H matrix, based on the frequency-domain signal 202 corresponding to the training signal.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting processing unit 52 associates a plurality of streams with a plurality of antennas 12, respectively. Further, the transmitting processing unit 52 applies CDD as shown in FIGS. 5A to 5D, FIGS. 6A to 6D and FIG. 7, and performs MIMO eigenmode transmission on the packet signals as shown in FIG. 4D. The transmitting processing unit 52 outputs finally the time-domain signals 200.

Figure 11:
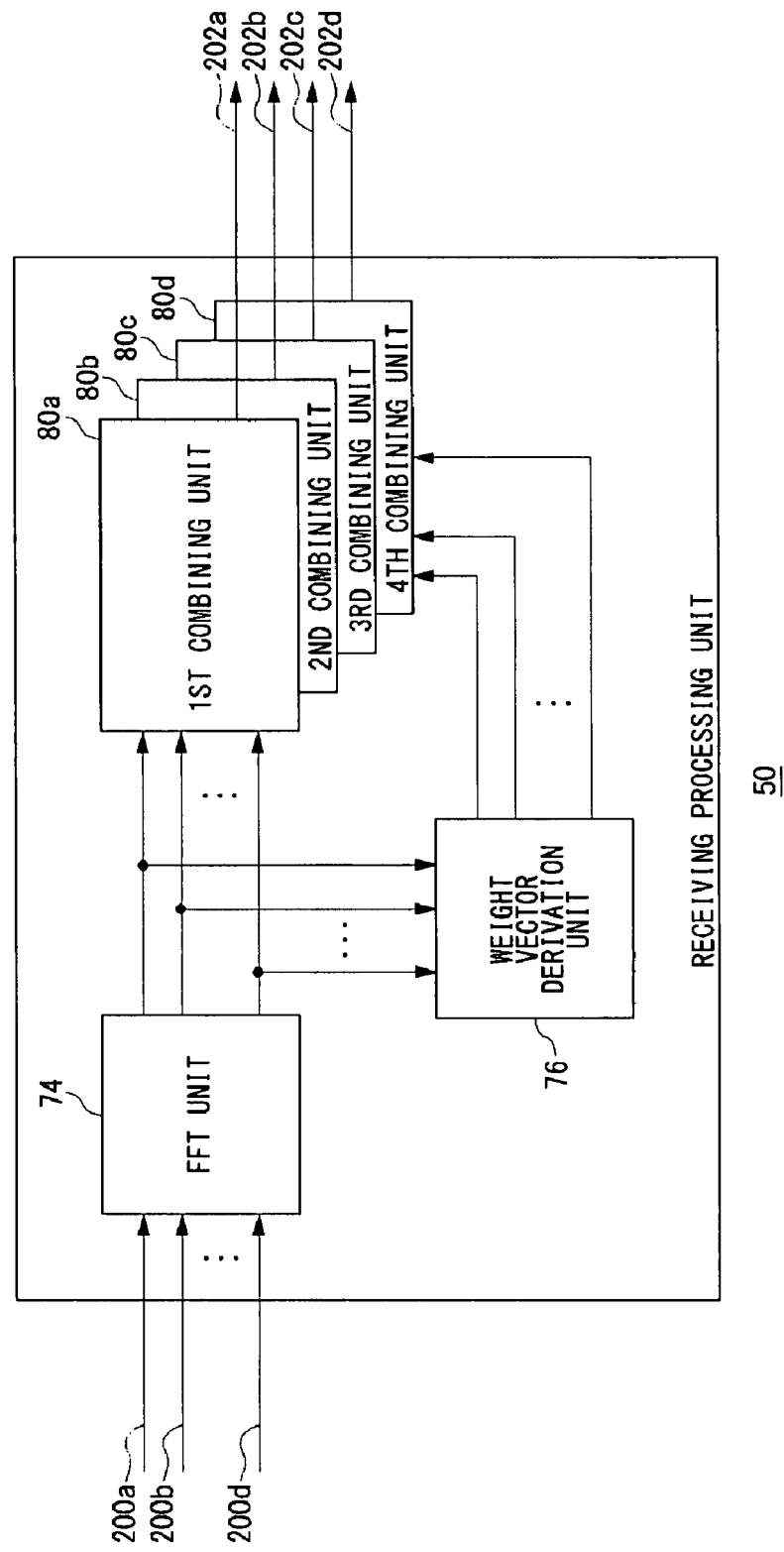
FIG. 11 illustrates a structure of a receiving processing unit as shown in FIG. 10.

FIG. 11 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. Thus, it is assumed here that the frequency-domain value is structured as shown in FIG. 9. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each subarrier. To derive a weight vector corresponding to a plurality of streams, an adaptive algorithm may be used or channel characteristics may be used. Since a known technique may be employed in such processings, the explanation thereof is omitted here. When deriving the weight vector, the weight vector derivation unit 76 executes an operation of the first component minus (−) the second component plus (+) the third component minus (−) the fourth component or the like, as described earlier. As described above, the weights are derived finally for each of subcarriers, antennas 12 and streams, respectively. The weight vector derivation unit 76 derives the above-described H matrix for each subcarrier as well as the weight vector.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors derived from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. With the summation of the multiplication results, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 12:
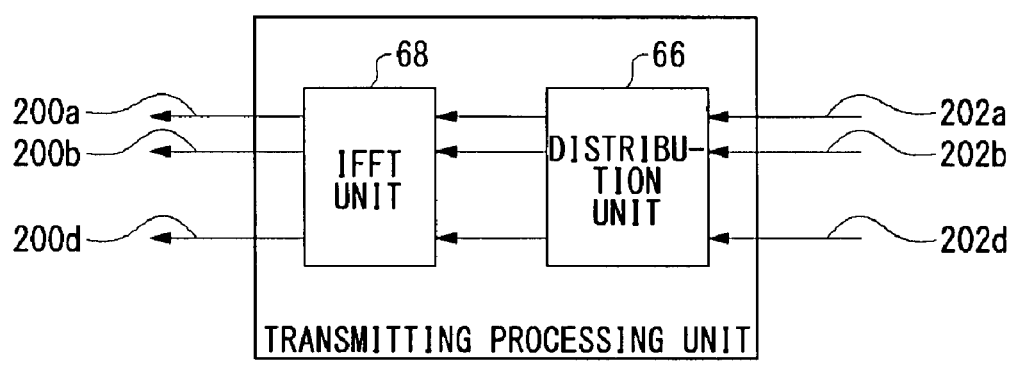
FIG. 12 illustrates a structure of a transmitting processing unit as shown in FIG. 10.

FIG. 12 illustrates a structure of the transmitting processing unit 52. The transmitting processing unit 52 includes a distribution unit 66 and an IFFT unit 68. The distribution unit 66 associates the frequency-domain signals 202 with the antennas 12. A description is first given of a processing performed when the training signal is transmitted. To produce the packet signals corresponding to FIGS. 5A to 5D and FIGS. 6A to 6D, the distribution unit 66 carries out CDD. CDD is expressed as a matrix C in the following Equation (5).

$$C(l) = \text{diag}(1, \exp(-j2\pi l\delta/N\text{out}), \ldots, \exp(-j2\pi l\delta (N\text{out}-1)/N\text{out})) \quad (5)$$

where δ indicates a shift amount and l a subcarrier number. The multiplication of the matrix C by a stream is done on a subcarrier-by-subcarrier basis. That is, the distribution unit 66 carries out a cyclic time shifting within the L-STF and so forth per stream. The amount of timing shift is set as in FIGS. 5A to 5D and FIGS. 6A to 6D.

The distribution unit 66 multiplies respectively the produced training signals, as in FIGS. 5A to 5D and FIGS. 5A to 5D, by a steering matrix so as to increase the number of streams for training signal up to the number of a plurality of streams. Before carrying out multiplication, the distribution unit 66 extends the degree of inputted signals to the number of a plurality of streams. In the case of FIG. 5B and FIG. 6B, "HT-STF" and the like assigned to the first and second streams are inputted, so that the number of signals inputted is "2", which will be represented by "Nin" here.

Accordingly, the inputted data are indicated by a vector of "Nin×1". The number of a plurality of streams is "4" and this is represented by "Nout" here. The distribution unit 66 extends the degree of inputted data to Nout from Nin. In other words, the vector of "Nin×1" is extended to the vector of "Nout×1". In so doing, "0s" are inserted to components from the (Nin+1)th row to the Nout-th row. On the other hand, the component up to Nin are "0's" for "HT-LTF" assigned to the third and the fourth stream of FIG. 5B and FIG. 6B, and HT-LTF and the like are inserted into the components from (Nin+1)th row to the Nout-th row.

A steering matrix is expressed by the following Equation (6).

$$S(l) = C(l)W \quad (6)$$

The steering matrix is a matrix of "Nout×Nout". W is an orthogonal matrix of "Nout×Nout". An example of the orthogonal matrices is a Walsh Matrix. Here, l is the subcarrier number, and the multiplication by a steering matrix is done on a subcarreri-by-subcarrier basis. C denotes CDD as described above. Here, the amounts of timing shift are so defined as to differ for a plurality of streams, respectively. That is, the amounts of timing shift for the first to the fourth stream are defined to be "0 ns", "−50 ns" "−100 ns" and "−150 ns", respectively.

When performing the MIMO eigenmode transmission, the distribution unit 66 receives the input of the above-described transmission weight vector from a not-shown control unit 30 and receives the input of packet signals of FIG. 4D. The distribution unit 66 multiplies the packet signals by a transmission weight vector. The IFFT unit 68 performs IFFT on the signals from the distribution unit 66 so as to generate the time-domain signal 200.

An operation of the communication system 100 structured as above will now be described. The first radio apparatus 10a transmits a training signal to the second radio apparatus 10b. After receiving the training signal, the second radio apparatus 10b derives an H matrix and transmits the derived H matrix to the first radio apparatus 10a. After receiving the H matrix, the first radio apparatus 10a performs singular value decomposition thereon so as to acquire a column vector contained in the steering matrix. When transmitting a packet signal, the first radio apparatus 10a derives a transmission weight vector by varying components contained in the packet signal. Also, the first radio apparatus 10a weights the packet signal with the transmission weight vector and transmits the weighted packet signal.

Hereinabelow, modifications will be described. The first modification relates to the first radio apparatus 10a which derives a time-varying transmission weight vector by varying each component contained in a column vector. Processings for varying the transmission weight vector differs from the processing described in the above exemplary embodiment. In the exemplary embodiment, the amplitude component is varied while the phase component of each component contained in the column vector is fixed but in this modification the phase component of each component is varied. That is, the control unit 30 varies the phase of each component, and adjusts the amplitude of each component so that a variation in power caused by the varying of the phase can be compensated for, thereby deriving a time-varying transmission weight vector. The communication system 100 according to the first modification is the same type as the communication system shown in FIG. 2, and the first radio apparatus 10a according to the first modification is the same type as the first radio apparatus 10a shown in FIG. 8.

A detailed description of the first modification will now be given. Similar to the above exemplary embodiment, the control unit 30 acquires the column vector v1. The control unit 30 stores a table that indicates variation patterns for v1(1), v1(2), v1(3) and v1(4), respectively. In the table, a plurality of amounts of variation, such as "0.1 degree", "−0.1 degree" and "0.15 degree", for v1(1), v1(2), v1(3) and v1(4), respectively are arranged therein. The control unit 30 sequentially acquires, per packet signal, the variation amounts starting from the beginning of the table and then rotates the phase component of each of them including v1(1) and the like. Here, the rotation is done by complex multiplication. As a result, the values of v1(1), v1(2), v1(3) and v1(4) vary for each packet signal. Here, the rotation result is denoted also by v1'(1), v1'(2), v1'(3) and v1'(4). A column vector containing these components will also be denoted by v1'.

The control unit 30 calculates the inner product of v1 and v1'. If the value of the inner product is less than a threshold value, the control unit 30 will extract another variation amount from the table and repeat the above-described processing so as to derive the column vector v1' again. If the value of the inner product becomes greater than or equal to the threshold value, the control unit 30 will derive a ratio of the value thereof to a predetermined value and derive gain based on the ratio. For example, if the ratio is "0.9", the gain will be derived as "1/0.9", for example. Note that the predetermined value may be predefined or may be the value of inner product of v1 itself, namely the inner product of v1 and v1. The control unit 30 amplifies each component of the column vector v1' by the gain. For example, if the gain is "1.1", the control unit 30 will multiply the in-phase component and orthogonal component of each component by "$\sqrt{1.1}$". The above processing is performed per packet signal. As a result of the above processing, even if the values of a column vector are identical over a plurality of packet signals, the values of a transmission weight vector will differ for each packet signal. Further, while weighting it with the transmission weight vector, the baseband processing unit 22 transmits packet signals.

Similar to the above, the second modification relates to the first radio apparatus 10a which derives a time-varying transmission weight vector. In what has been described so far, a case where a packet signal composed of one stream is transmitted is treated. In the second modification, discussed is a case where a packet signal composed of two or more streams is transmitted. That is, those shown in FIGS. 4A to 4C are to be transmitted. The communication system 100 according to the second modification is of the same type as the communication system 100 shown in FIG. 2, and the first radio apparatus 10a is of the same type as the first radio apparatus 10a shown in FIG. 8.

Similar to the above, the control unit 30 acquires a steering matrix V. Then the control unit 30 extracts column vectors from the steering matrix V where the number of extracted column vectors is equal to the number of streams. For example, if the number of streams is two, the control unit 30 will extract v1 and v2 as the column vectors. Here, v1 corresponds to the first stream whereas the v2 the second stream. Also, the control unit 30 derives a plurality of candidate transmission weight vectors orthogonal to column vectors that correspond to streams other than the one stream. For example, a plurality of column vectors orthogonal to the column vector v2 are derived as candidate transmission weight vectors w1' to be used for the first stream. Accordingly, there are a plurality of candidate transmission weight vectors w1'. Similarly, a plurality of candidate transmission weight vectors w2' are derived for the second stream.

The control unit 30 derives a time-varying transmission weight vector in a manner that it is selected by switching the candidates of transmission weight vectors. For example, a selection is made by switching the transmission weight vector candidates w1' so as to derive a time-varying transmission weight vector w1. Here, the pattern in the combination of candidates w1' and w2' to be selected is stored beforehand in memory of the control unit 30, and it is preferably defined such that the cycle at which the same combination are selected be longer in this pattern.

The above-described operation is now explained in a more specific manner. For clarity of explanation, assume herein that the number of streams is two. Using Gram-Schmidt orthogonalization, the control unit 30 generates a plurality of vectors orthogonal to both v1 and v2. Since the Gram-Schmidt orthogonalization is a known technique, the detailed description therefor is omitted here. Since the two vectors v1 and v2 are each four dimensional, four orthogonal vectors are generated. These four orthogonal vectors correspond to the above-mentioned candidate transmission weight vectors w1' and w2'. Note that, in the four orthogonal vectors, no clear distinction is made between the candidates w1' and w2' of transmission weight vectors. Therefore, the four orthogonal vectors are the candidate w1' of transmission weight vector and also the candidate w2' thereof.

The control unit 30 selects two from the four orthogonal vectors, and outputs the selected vectors as transmission weight vectors w1 and w2. As described earlier, the selection pattern is stored in the memory of the control unit 30 and is preferably defined such that the cycle at which the same combination are selected be longer in this pattern. Further, while weighting it with the transmission weight vector, the baseband processing unit 22 transmits a packet signal composed of multiple streams.

Similar to the second modification, the third modification relates to the first radio apparatus 10a which derives a time-varying transmission weight vector when a packet signal composed of two or more streams is transmitted. However, how to derive the time-varying transmission weight vector differs from that of the second modification.

Similar to the above, the control unit 30 acquires a steering matrix V. Then the control unit 30 extracts column vectors from the steering matrix V where the number of extracted column vectors is equal to the number of streams. For example, if the number of streams is two, the control unit 30 will extract v1 and v2 as the column vectors. Here, v1 corresponds to the first stream whereas the v2 the second stream. Based on a column vector associated with one stream, the control unit 30 derives a transmission weight vector for said one stream and, at the same time, varies each component contained in a column vector associated with the other stream so as to derive a time-varying transmission weight vector for the other stream.

For example, the control unit 30 determines the column vector v1, associated with the first stream, for a transmission weight vector w1 corresponding to the first stream. Also, the control unit 30 varies each component of v2 associated with the second stream so as to derive a time-varying transmission weight vector w2 for the second stream. More specifically, while fixing the phase of each component, a time-varying transmission weight vector w2 is derived by varying the amplitude thereof. In particular, the control unit 30 varies the amplitude of one of four components contained in the column vector v2. Here, a variation pattern, namely a gain pattern, is stored beforehand in the memory of the control unit 30.

Note that the control unit 30 varies them in a manner such that the inner product of the transmission weight vector w2 and the column vector v2 is brought close to a predetermined value. That is, if the inner product of the derived transmission weight vector w2 and the column vector v2 is less than the predetermined value, the control unit 30 will discard said transmission weight vector w2, extract another a gain value from the memory and derive the transmission weight vector w2 again by the extracted gain value. While weighting it with the transmission weight vector, the baseband processing unit 22 transmits a packet signal composed of multiple streams.

According to the present exemplary embodiment, a time-varying transmission weight vector is derived by varying each component contained in a column vector. Thus, the continuous interception by untargeted radio apparatuses can be reduced in the MIMO eigenmode transmission. Since the continuous interception is reduced, the security can be improved. The amplitude is varied while the phase is being fixed. Thus the in-phase combining in a receiving apparatus to be communicated is made possible and the form of a side lobe can be deformed or modified. Since a constraint is so defined that the inner product of a column vector and a weight vector is brought close to a predetermined value, the worsening of receiving characteristics in a receiving apparatus to be communicated can be restricted. Among the components of a column vector, those other than one component are varied by a predetermined pattern, so that the processing can be simplified. Adjustment is done to one component, so that the processing can be simplified. The amplitude is adjusted by varying the phase, so that reduction in transmission power can be restricted though the form of a side lobe is being deformed.

Also, the candidates of transmission weight vectors mutually orthogonal to one another are switched and selected. As a result, the deterioration of SINR in the radio apparatus to be communicated is restricted in the MIMO eigenmode transmission, whereas the continuous interception by untargeted radio apparatuses can be reduced. The candidates of transmission weight vectors are preferably derived at first and then it is only necessary to select it, so that the processing can be simplified. Since the deterioration of SINR is restricted, the worsening of receiving characteristics can be suppressed. Since a transmission weight vector for one stream is varied, the continuous interception by untargeted radio apparatuses can be reduced in the MIMO eigenmode transmission. The amplitude is varied while the phase is being fixed. Thus the in-phase combining in a receiving apparatus to be communicated is made possible and the form of a side lobe can be deformed or modified. Since a constraint is so defined that the inner product of a column vector and a transmission weight vector is brought close to a predetermined value, the worsening of receiving characteristics in a receiving apparatus to be communicated can be suppressed.

The present invention has been described based on exemplary embodiments and their modifications. These are merely exemplary, and it is understood by those skilled in the art that various further modifications to the combination of each component and process thereof are possible and that such modifications are also within the scope of the present invention.

In an exemplary embodiment of the present invention, the second radio apparatus 10b derives an H matrix. However, this should not be considered as limiting and, for example, the H matrix may be derived in the first radio apparatus 10a which is an transmitting-side apparatus. That is, an arrangement may be such that an H matrix used for an uplink is derived and this H matrix is used for the derivation of a transmission weight vector in a downlink. In so doing, the training signal is transmitted from the second radio apparatus 10b to the first radio apparatus 10a.

When the H matrix is derived in the first radio apparatus 10a, the number of antennas 14 used when the second radio apparatus 10b sends the training signal may differ from that of antennas 14 used when the second radio apparatus 10b received the packet signal. For example, the former number thereof is "2" whereas the latter number thereof is "4". In this case, after the H matrix for the "two" antennas 14 has been derived, the transmission weight vector is derived. The second radio apparatus 10b receives a packet signal, which is transmitted from the first radio apparatus 10a and has been weighted with the transmission weight vector, by the "four" antennas 14. According to this modification, there is no need for the second radio apparatus 10b to transmit the H matrix, so that the transmission efficiency can be improved.

In an exemplary embodiment of the present invention, multicarrier signals are to be processed in the communication system 100. However, this should not be considered as limiting and, for example, single carriers may be used and processed. According to this modification, the present invention can be applied to various types of communication systems.

While the preferred embodiments of the present invention and modifications thereof have been described using specific terms, such description is for illustrative purposes only, and it is to be understood that changes and variations may be further made without departing from the spirit or scope of the appended claims.

What is claimed is:

1. A transmitting apparatus, comprising:
a plurality of transmitting antennas which transmit signals;
an acquiring unit which acquires a predetermined column vector from a steering matrix derived by performing singular value decomposition on a channel matrix whose element values correspond to channel characteristics between said plurality of transmitting antennas and a plurality of receiving antennas, respectively; and
a derivation unit which varies each of components contained in the column vector acquired by said acquiring unit so as to derive a time-varying weight vector that varies with time, wherein
the signals are weighted with the time-varying weight vector and sent from the plurality of transmitting antenna.

2. A transmitting apparatus according to claim 1, wherein said derivation unit varies the amplitude of each component contained in the column vector by fixing the phase of the each component contained in the column vector so as to derive the time-varying weight vector.

3. A transmitting apparatus according to claim 2, wherein said derivation unit derives the time-varying weight vector [by varying the column vector and the weight vector] in a manner that an inner product of the column vector and the time-varying weight vector is brought close to a predetermined value.

4. A transmitting apparatus according to claim 3, wherein said derivation unit derives the time-varying weight vector by adjusting one of the components so that the inner product of the column vector and the time-varying weight vector are brought close to the value, and varies the other components by a predetermined pattern.

5. A transmitting apparatus according to claim 1, wherein said derivation unit derives the time-varying weight vector by varying the phase of each component contained in the column vector and adjusting the amplitude of the each component contained in the column vector in a manner such that variation in power caused by the varying of the phase is compensated for.

6. A transmitting method to be performed by a transmitter having a plurality of transmitting antennas, comprising:
transmitting a signal from the plurality of transmitting antennas;
acquiring a predetermined column vector of a steering matrix which is derived by performing singular value decomposition on a channel matrix whose element values correspond to channel characteristics between the plurality of transmitting antennas and a plurality of receiving antennas, respectively; and
deriving a time-varying weight vector that varies with time by varying each component contained in the acquired column vector, wherein
the signal is weighted with the time-varying weight vector and sent from the plurality of transmitting antenna.

7. A transmitting apparatus, comprising:
a plurality of transmitting antennas which transmit a signal composed of a plurality of streams;
an acquiring unit which acquires a steering matrix wherein the steering matrix is derived by performing singular value decomposition on a channel matrix whose element values correspond to channel characteristics between said plurality of transmitting antennas and a plurality of receiving antennas, respectively; and
a derivation unit which derives a time-varying weight vector that varies with time for one stream and derives time-varying weight vectors that varies with time for the other streams, respectively, in a manner that a plurality of column vectors contained in the steering matrix acquired by said acquiring unit are associated with the plurality of streams, a plurality of candidates of weight vectors orthogonal to column vector corresponding to streams other than said one stream are derived and then the plurality of candidates of weight vectors are switched and selected, wherein
the signal is weighted with the selected time-varying weight vectors and sent from the plurality of transmitting antenna.

8. A transmitting apparatus, comprising:
a plurality of antennas which transmit a signal composed of two streams;
an acquiring unit which acquires a steering matrix wherein the steering matrix is derived by performing singular value decomposition on a channel matrix whose element values correspond to channel characteristics between the plurality of transmitting antennas and a plurality of receiving antennas, respectively; and
a derivation unit which associates two of column vectors contained in the steering matrix acquired by said acquiring unit with the two streams, derives a time-varying weight vector that varies with time for one stream based on a column vector associated with said one stream and derives a time-varying weight vector that varies with time for the other stream by varying each component contained in a column vector associated with the other stream, wherein
the signal is weighted with the time-varying weight vectors and sent from the plurality of transmitting antenna.

9. A transmitting apparatus according to claim 8, wherein said derivation unit derives the time-varying weight vectors by varying the amplitude of each component with the phase thereof fixed.

10. A transmitting apparatus according to claim 9, wherein said derivation unit derives the time-varying weight vectors in a manner such that an inner product of a column vector associated with one stream and a corresponding time-varying weight vector is brought close to a predetermined value.

11. A transmitting method to be performed by a transmitter having a plurality of transmitting antennas, comprising:
transmitting from the plurality of transmitting antennas a signal composed of a plurality of streams;
acquiring a steering matrix which is derived by performing singular value decomposition on a channel matrix whose element values correspond to channel characteristics between the plurality of transmitting antennas and a plurality of receiving antennas, respectively; and
deriving a time-varying weight vector that varies with time for one stream and deriving time-varying weight vectors that vary with time for the other streams, respectively, in a manner that a plurality of column vectors contained in the acquired steering matrix are associated with the plurality of streams, a plurality of candidates of weight vectors orthogonal to column vector corresponding to streams other than said one stream are derived and then the plurality of candidates of weight vectors are switched and selected, wherein
the signals is weighted with the selected time-varying weight vectors and sent from the plurality of transmitting antenna.

12. A transmitting method to be performed by a transmitter having a plurality of transmitting antennas, comprising:
transmitting from the plurality of transmitting antennas a signal composed of two streams;
acquiring a steering matrix which is derived by performing singular value decomposition on a channel matrix whose element values correspond to channel characteristics between the plurality of transmitting antennas and a plurality of receiving antennas, respectively; and
associating two of column vectors contained in the acquired steering matrix with the two streams, deriving a time-varying weight vector that varies with time for one stream based on a column vector associated with said one stream, and deriving a time-varying weight vector that varies with time for the other stream by varying each component contained in a column vector associated with the other stream, wherein
the signal is weighted with the time-varying weight vectors and sent from the plurality of transmitting antenna.

* * * * *